United States Patent [19]

Smith, Jr. et al.

[11] Patent Number: 5,200,497
[45] Date of Patent: Apr. 6, 1993

[54] POLYIMIDE FROM BIS(N-ISOPRENYL)S OF ARYL DIAMIDES

[75] Inventors: Joseph G. Smith, Jr., Hampton; Raphael M. Ottenbrite, Midlothian, both of Va.

[73] Assignee: The United States of America as represented by the Adminstrator, National Aeronautics and Space Administration, Washington, D.C.

[21] Appl. No.: 568,128

[22] Filed: Aug. 16, 1990

[51] Int. Cl.$^5$ ............................................. C08F 222/40
[52] U.S. Cl. .................................. 526/262; 528/170; 528/321; 528/322

[58] Field of Search ................ 526/262; 528/322, 321, 528/170

[56] References Cited

U.S. PATENT DOCUMENTS 4,593,083 6/1986 Stenzenberger ...................... 526/262
4,822,870 4/1989 Restaino ............................... 526/262

*Primary Examiner*—Harold D. Anderson
*Attorney, Agent, or Firm*—George F. Helfrich

[57] ABSTRACT

A process and polyimide product formed by the reaction of a bismaleimide with a bis(amidediene) wherein the bis(amidediene) is formed by reacting an excess of an acid chloride with 1,4-N,N'-diisoprenyl-2,3,5,6-tetramethyl benzene.

3 Claims, No Drawings

POLYIMIDE FROM BIS(N-ISOPRENYL)S OF ARYL DIAMIDES

ORIGIN OF THE INVENTION

This invention was made in the performance of work under a NASA Grant and is subject to the provisions of Public Law 96-517 (35 USC 202). The contractor has elected not to retain title.

FIELD OF THE INVENTION

This invention relates generally to high temperature polymeric materials and relates specifically to polyimides prepared from bis(N-isoprenyl)s of aryl diamides.

BACKGROUND OF THE INVENTION

A major goal in the synthesis of polymides has been to prepare aromatic polyimides having the desired physical and thermal properties to permit dependable aerospace utilization. Recent research has been directed towards developing polyimides that are soluble in common organic solvents, readily processable, and thermally curable without the evolution of volatile by-products. See, for example, Mittal, K. L., "Polyimides: Synthesis, Characterization, and Applications", New York: Plenum Press, 1984; Cassidy, P. E. "Thermally Stable Polymers: Synthesis and Properties", New York: Marcel Dekker, Inc., 1980; and Hergenrother, P. and T. L. St. Clair, "Proceedings of Second International Conference on Polyimides", in Ellenville, N.Y., 1985.

The melt processability of these polyimides can be enhanced by incorporation of aryl-ether and meta-phenylene linkages within the polymer backbone.

One method of synthesizing aromatic polyimides utilizes the Diels-Alder polymerization of bis(3,4-dimethyleaepyrrolidyl) arylenes and bismaleimides (see Ottenbrite, R. M., Yoshimatse, A., and Smith, J. G. *Poly. Prepr.*, 1987, Vol 28 (2), 280; and Ottenbrite, R. M., and Smith, J. G., *Poly. Prepr.*, 1988, Vol 29 (1) 263). A problem with this monomer system is that it is very reactive; thus, making purification and storage difficult. Also, the polymers prepared from this system were soluble only in concentrated sulfuric acid.

To reduce the reactivity of this bis(exocyclediene), one of the pyrrolidyl ring bonds holding the diene in the reactive s-cis configuration was eliminated by the synthesis of bis(N-isoprenyl) tertiary aromatic amines (see Ottenbrite, R. M. and Smith, J. G., "Preparation of Polyimides from Di(isoprenyl) Diamines", *Poly. Prepr.*, 1989, Vol 30 (1). These monomers were observed to be less reactive thus, allowing for their purification and storage. However, polymers prepared from this monomer system were of low molecular weight.

To increase the reactivity of the bis(N-isoprenyl) monomer, steric bulk was introduced in the ortho positions to the aromatic amine functionality by the synthesis of 1,4-N,N'-diisoprenyl-2,3,5,6-tetramethyl benzene (see Ottenbrite, R. M. and Smith, J. G. "Polyimides Prepared from Bis(isoprenyl) of Sterically Hindered Aryl Diamines", *Poly. Prepr.*, 1989, vol 30 (1).) Results from the inherent viscosity data indicates that this monomer series was more reactive than those previously reported, however the resulting polymer is easily oxidized as evident by the TGA data in air. In the present invention, it is hypothecated that this oxidation may be occurring at the secondary amine site, and the amidation of the bis(N-isoprenyl) secondary amine monomers is effected to eliminate the easily oxidized amine group and to further increase the reactivity of the bis(N-isoprenyl) monomer.

SUMMARY OF THE INVENTION

Accordingly, it is an object of the present invention to synthesize improved thermally stable and soluble polyimides via the Diels-Alder reaction.

Another object of the present invention is the preparation of polyimides from bis(N-isoprenyl)s of aryl diamides.

A further object of the present invention is to prepare high temperature polymeric materials, especially linear aromatic polyimides, that maintain their integrity and toughness during long exposure times at elevated temperatures.

Another object of the present invention is a bis(N-isoprenyl) monomer having improved reactivity.

An additional object of the present invention is a process for preparing a 1,4-N,N'-diamido-N,N'-disoprenyl-2,3,5,6-tetramethyl benzene monomer for use in preparing novel polyimides.

Another object of the present invention is an improved polyimide formed as the reaction product of a bis(N-isoprenyl) of an aryl diamide and a bismaleimide.

According to the present invention the foregoing and additional objects are attained by preparing a bis-(amidediene), having the general formula identified as I in the general copolymerization equation below, which is a novel material formed from the monomer 1,4-N,N'-diisoprenyl-2,3,5,6-tetramethylbenzene. This bis-(amidediene) undergoes Diels-Alder reaction with a bismaleimide, identified as II in the general copolymerization equation below, without the evolution of gaseous by-products, to form the aromatic polyimide (identified as III in the general copolymerization equation below).

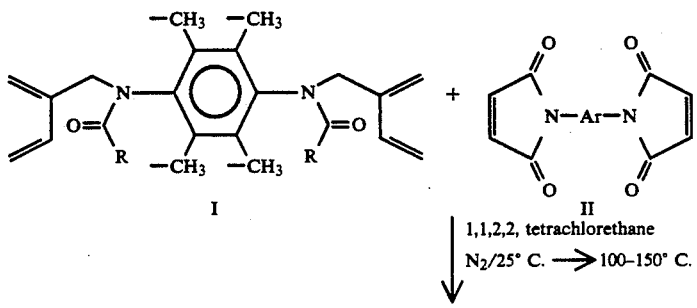

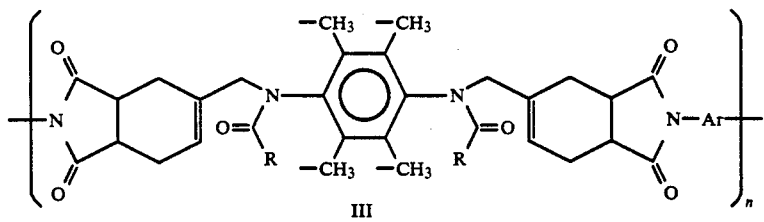

where n is an integer equal to or greater than 1; R is selected from the group of radicals consisting of

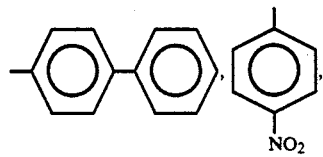

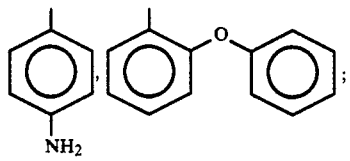

and

Ar is selected from the group of radicals consisting of

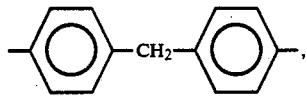

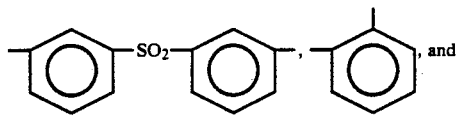

DESCRIPTION OF THE PREFERRED EMBODIMENTS

Synthesis of 1,4-N,N'-diacetamido-N,N'-diisoprenyl-2,3,5,6-tetramethyl benzene 1,4-N,N'-diacetamido-N,N'-diisoprenyl-2,3,5,6-tetramethyl benzene was prepared by reacting 1,4,-N,N'-diisoprenyl-2,3,5,6-tetramethyl benzene with an excess of acetyl chloride in 40 ml of benzene containing 1.3 ml of propylene oxide as an acid scavenger. The reaction mixture was stirred for 36 hours at room temperature while the flask was covered with foil to avoid light catalyzed polymerization of the reactants or products. Excess acid chloride was destroyed by the addition of 95% ethanol to the reaction. The solution was concentrated on a rotoevaporator and methanol subsequently added to the mixture. Dropwise addition of distilled water precipitated the crude product. The monomer was purified by dissolving in a methanol/acetone solvent mixture (1:10), vacuum filtering, and precipitating by the dropwise addition of distilled water to afford a 74% yield. $^1$H NMR (CDCl$_3$) 1.7–1.8 ppm (d,6H), 4.35 ppm (s,4H), 4.6–5.75 ppm (m,8H), 6.0–6.65 ppm (dd,2H).

Similar bis(amidediene) monomers were also prepared using other acid chlorides including benzoyl, 2-naphthoyl, 4-phenylbenzoyl, 4-nitrobenzoyl, and 2-phenoxybenzoyl. The 2-naphthoyl and 2-phenoxybenzoyl functionalities were chosen for their relative size (as compared to the phenyl moiety), which should increase the concentration of the cisoid configuration of the diene system. The 4-nitrobenzoyl functionality was chosen so as to provide a functional group (nitro substituent) which could be further manipulated chemically to prepare some novel bis(amidediene)s.

The infrared spectrum for these monomers exhibited a strong carbonyl absorption (Amide 1 Band) ranging from 1647–1526 cm$^{-1}$. Conjugation of the amide carbonyl functionality to the aromatic systems resulted in absorptions at lower wave numbers. The bis(amidediene) monomers were soluble in benzene and chlorinated hydrocarbons except for the 2-naphthoyl derivative, which was insoluble in benzene. The 4-nitrophenyl derivative was partially soluble in TCE and insoluble in chloroform, while the 4-aminophenyl derivative exhibited partial solubility in chlorinated hydrocarbons. These monomers did not exhibit melting points below 270° C. as determined by DSC analysis and elemental analyses were within 0.3% of the theoretical values with the exception of low carbon values found for the methyl, 4-phenylbenzoyl, 4-nitrophenyl, and 4-aminophenyl derivatives which will be further discussed hereinafter.

POLYMERIZATION

Equimolar quantities of the bis(amidediene) and bis-maleimide, with hydroquinone added as a radical scavenger, were dissolved in 1,1,2,2-tetrachloroethane (TCE) to afford a 25–30% (w/w) solution. The solution was mechanically stirred at room temperature overnight under a nitrogen atmosphere and the reaction temperature then raised to 100°–150° C. and maintained for 15–36 hours with stirring. During this time, the reaction mixture became viscous and was diluted by the addition of small quantities of solvent (1–2 ml) from time to time to maintain efficient stirring. The resulting polymer was precipitated by adding the room temperature cooled solution, dropwise, to a quantity of diethyl ether. The recovered polyimide precipitate was dried under vacuum.

Inherent viscosities were obtained for 0.5% chloroform solutions at 30° C. +/− 0.5° C. in a Cannon-Ubbelohde viscometer. Differential Scanning Calorimetry (DSC) was performed on a Dupont model 1090 instrument at a heating rate of 20° C./min with glass transition temperatures (Tg) taken as the inflection point of the ΔT vs temperature curve. Thermogravimetric analysis was performed on a Perkin Elmer Instrument (Program Temperature Controller model UV-1, Heater Controller and Auto Balance model AR-2) on powdered samples at a heating rate of 2.5° C./min in nitrogen and air. Spectral data (IR and $^1$H NMR) confirmed the structure of the products.

Model Synthesis

The copolymerization of the bis(amidedienes) with bismaleimides occurred by a Diels-Alder reaction as determined with NMR on model systems. Model compounds were prepared by reacting two moles of N-phenyl maleimide with the bis(amidedienes) in chloroform (approximately 30% (w/w) at room temperature and with hydroquinone added as a radical scavenger. The color of the products ranged from white to an off-white, except for the acetyl derivative which was light-tan. Elemental analyses were within 0.3% of the theoretical values except for the carbon values which were 0.4–0.9%.

Infrared absorptions at 1774, 1704, and 1380 cm$^{-1}$ observed proved to be characteristic of the imide functionality. The amide I band (carbonyl stretch) ranged from 1647-1619 cm$^{-1}$. The splitting pattern for the cyclohexene ring was different for each compound and was very broad and diffuse in the range of 1.35-3.27 ppm. The absorption for the vinylic proton attached to the C-6 carbon of the isoindole type system ranged from 5.00-5.70 ppm. This signal appeared as a broad doublet for the benzoyl, 2-naphthoyl, 4-phenylbenzoyl and 4-nitrobenzoyl derivatives. This proton provided a complex multiplet for the 2-phenoxybenzoyl system due to the steric bulk provided by the 2-phenoxybenzoyl substituent.

These amideimide adducts did not exhibit well defined melting points, but several endo- and exothermic transitions observed by DSC suggest that the Diels-Alder adducts are undergoing retro cycloaddition reactions at elevated temperatures (endothermic transitions) with subsequent addition reactions of the regenerated 1,3-diene and dienophile reactants (exothermic transitions).

Polymer Preparation

Polymers were prepared for each of the bis(amidediene) and bismaleimide combinations (as set forth in the general formula above) by the reaction of stoichiometric quantities with hydroquinone added as a radical scavenger and utilizing 1,1,2,2-tetrachloroethane (TCE) as the solvent. The flask was equipped with a mechanical stirrer and flushed with nitrogen for 5-10 minutes. Heating to 70°-80° C. for 5-10 minutes dissolved the monomers and the solution was allowed to cool to room temperature (the preparation of the naphthoyl derivatized bis(amidediene) monomer required the solution temperature to be maintained at 70°-75° C. due to the limited solubility of this monomer). The color of the polymerization mixtures ranged from yellow to yellow-green.

The polymerizations were carried out at room temperature overnight with a subsequent increase in temperature to 100°-150° C., that was maintained for the 15-36 hours necessary to complete the reaction. The increase in reaction temperature allowed for more efficient stirring of the reaction media by decreasing the solution viscosity. Small aliquots of TCE were added to the reaction as the viscosity increased to maintain efficient stirring.

The polyimides were obtained as either powders or fibrous materials, depending on the apparent molecular weight of the system, and colors ranged from light brown to white. These polymers were soluble in N,N-dimethylacetamide and chlorinated hydrocarbons, with the exception of the polymer prepared from the 4-aminophenyl derivatized bis(amidediene). This insolubility is possibly due to the strong intermolecular hydrogen bonding between the amine and imide functionalities. It was determined from inherent viscosity data (0.21-0.81 dL/g) that the polymers are low-to-medium molecular weight although the monomer system of the present invention does provide higher molecular weight materials than those obtained from previously reported bis(N-isoprenyl) monomers. This increase in molecular weight was attributed to the increase in the reactivity of the 1,3-butadienyl system through steric effects. Moderate thermal stability was observed by thermogravimetric analysis with 10% weight loss ranging from 318°-356° C. and 316°-381° C. in air and helium, respectively. No weight gain was observed for these materials in air. Tg's were obtainable for these polymers and ranged from 202°-260° C. Films cast from chloroform were flexible and creasible for the methyl, 4-phenylbenzoyl, phenyl, and 4-nitrophenyl derivatives.

Although the present invention has been described in detail with respect to certain preferred embodiments thereof, these embodiments are intended as exemplary only and are not to be deemed as exhaustive. There are many variations and modifications of the specific details described herein that will appear readily apparent to those skilled in the art in the light of the above teachings.

Accordingly, it is to be understood that, within the scope of the appended claims, and without departing from the spirit and scope of the invention as set forth herein, the invention may be practiced other than as specifically described.

What is claimed as new and desired to be secured by Letters Patent of the United States is:

1. A polyimide formed of recurring units of

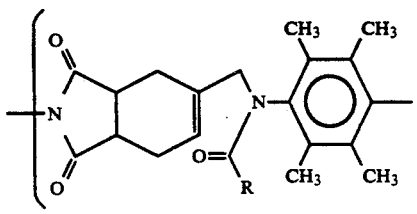

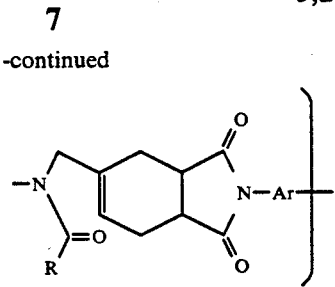

R is selected from the group of radicals consisting of

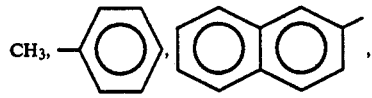

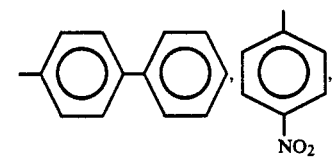

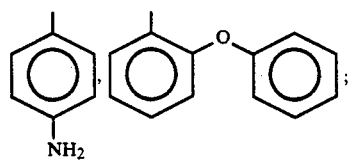

and
Ar is selected from the group of radicals consisting of

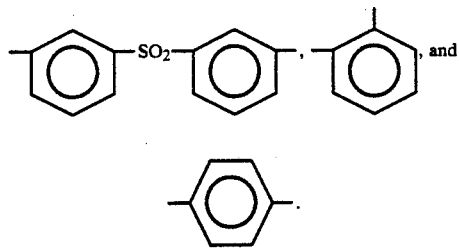

2. A method of making an aromatic polyimide by combining stoichiometric quantities of a bis(amidediene) having the general formula

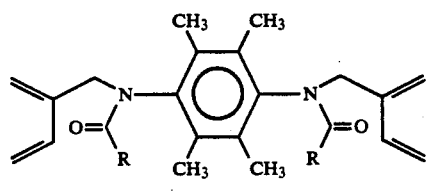

and a bismaleimide having the general formula

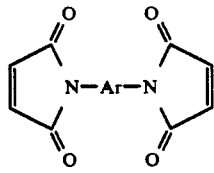

to yield a polymer having recurring units of

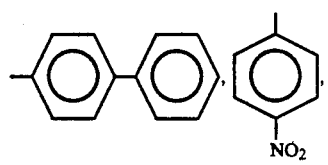

where
R is selected from the group of radicals consisting of

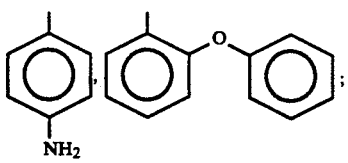

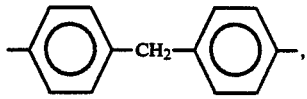

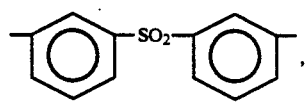

and
Ar is selected from the group of radicals consisting of

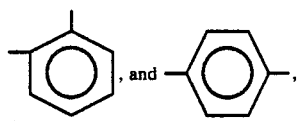, and wherein the bis(amidediene) and the bismaleimide are combined by dissolving the bis(amidediene) and bismaleimide in a flask containing 1,1,2,2-tetrachlorethane solvent by heating the flask to 70°–80° C., with stirring and under nitrogen, for 5–10 minutes; permitting the solution to cool to room temperature and maintaining the stirring under a nitrogen atmosphere for at least 12 hours; increasing the temperature to 100°–150° C., while maintaining this temperature, stirring and under a nitrogen atmosphere; cooling the solution to room temperature; adding the solution dropwise to a quantity of diethyl ether to precipitate the polymer; and filtering and drying the recovered precipitate under vacuum to obtain the polyimide.

3. A polyimide reaction product of a bis(amidediene) and a bismaleimide, the bis(amidediene) having the general formula

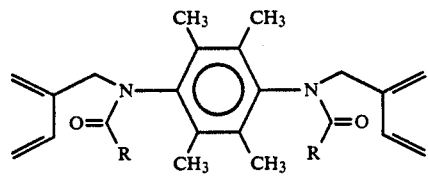

where R is selected from the group of radicals consisting of

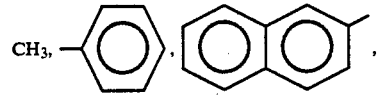

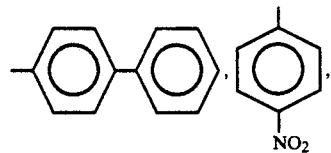

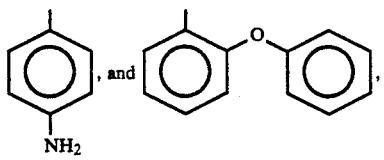

and the bismaleimide having the general formula

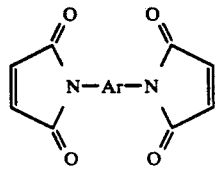

where Ar is selected from the group of radicals consisting of

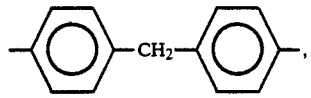

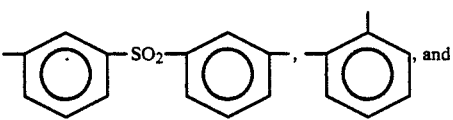

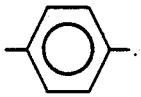

* * * * *